United States Patent
Thirupparangiri et al.

(10) Patent No.: US 9,558,159 B1
(45) Date of Patent: Jan. 31, 2017

(54) CONTEXT-BASED DYNAMIC RENDERING OF DIGITAL CONTENT

(71) Applicant: Amazon Technologies, Inc., Seattle, WA (US)

(72) Inventors: Udhaya Kumar Thirupparangiri, Madurai (IN); Frederick Hughes Clarke, Bellevue, WA (US); Michael Patrick Bacus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/713,412

(22) Filed: May 15, 2015

(51) Int. Cl.
*G09G 5/24* (2006.01)
*G06F 17/21* (2006.01)
*G06F 17/00* (2006.01)
*G06F 3/0481* (2013.01)
*G06F 17/27* (2006.01)

(52) U.S. Cl.
CPC .......... *G06F 17/21* (2013.01); *G06F 17/2735* (2013.01); *G06F 17/2765* (2013.01); *G09G 5/24* (2013.01); *G09G 2354/00* (2013.01); *G09G 2380/14* (2013.01)

(58) Field of Classification Search
CPC combination set(s) only.
See application file for complete search history.

(56) References Cited

U.S. PATENT DOCUMENTS

| | | | |
|---|---|---|---|
| 7,191,117 B2* | 3/2007 | Kirby | G06F 17/27 348/E5.06 |
| 8,834,166 B1* | 9/2014 | Ionkov | G06F 17/30595 434/178 |
| 2012/0001923 A1* | 1/2012 | Weinzimmer | G06F 3/013 345/473 |
| 2012/0137217 A1* | 5/2012 | Amsterdam | G06F 1/3228 715/256 |
| 2012/0245720 A1* | 9/2012 | Story, Jr. | G06F 3/04842 700/94 |
| 2014/0142954 A1* | 5/2014 | Cameron | G11B 20/10527 704/276 |
| 2014/0365875 A1* | 12/2014 | De Assuncao | G06Q 30/0601 715/251 |
| 2015/0310002 A1* | 10/2015 | Yu | G06F 17/241 707/750 |
| 2015/0370331 A1* | 12/2015 | Gonzales, Jr. | G06F 3/017 345/156 |
| 2016/0041949 A1* | 2/2016 | Gluck | G06F 17/218 715/256 |

* cited by examiner

*Primary Examiner* — Wesner Sajous
(74) *Attorney, Agent, or Firm* — Sutherland Asbill & Brennan LLP

(57) ABSTRACT

Systems, methods, and computer-readable media are disclosed for dynamic character enhancement for rendering digital content. Example methods may include identifying a reading speed indicative of a rate at which a user desires to read, determining a number of words in a portion of content to present to the user, and determining a base time interval for at least one word of the portion of content based at least in part on the reading speed. Methods may include determining an average difficulty value of the portion of content, determining that a first difficulty value of a first word exceeds the average difficulty value, and determining a first time adjustment for the first word based at least in part on the first difficulty value. Methods may include determining a first time interval based at least in part on the base time interval and the first time adjustment.

20 Claims, 7 Drawing Sheets

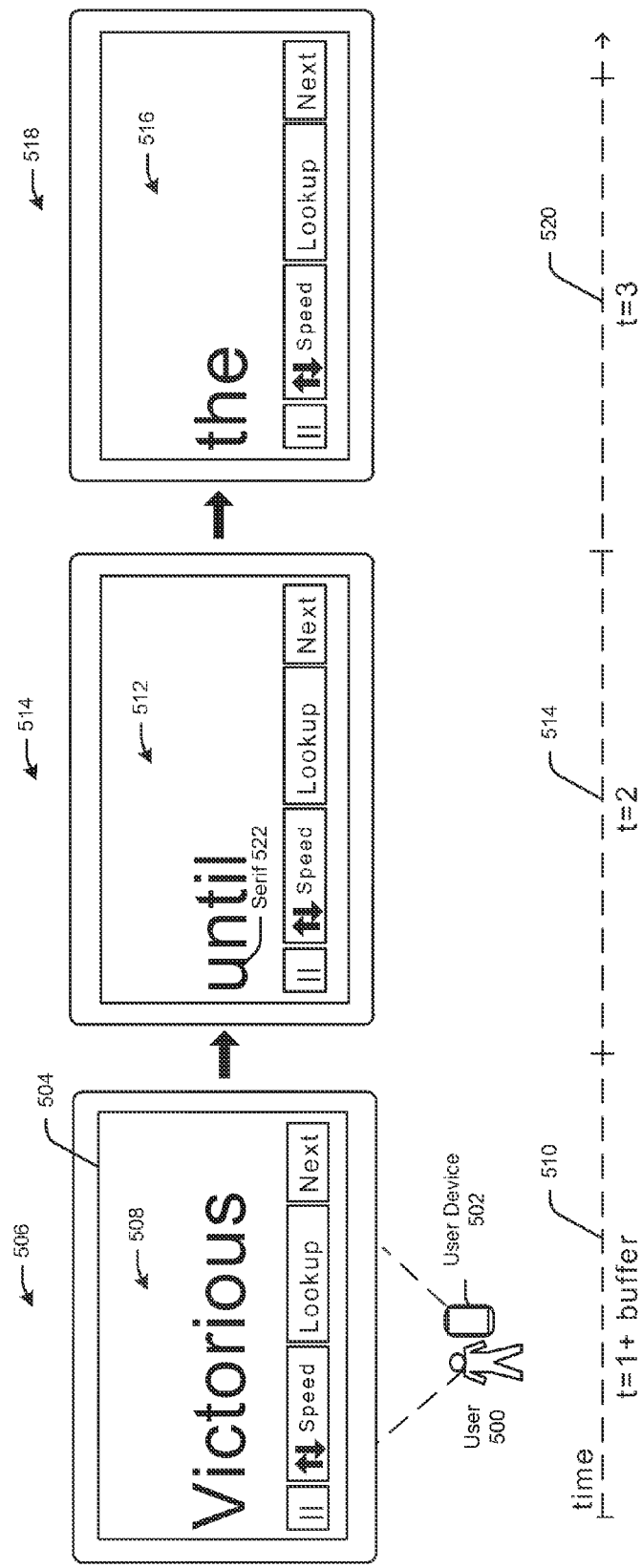

CONTEXT-BASED DYNAMIC RENDERING OF DIGITAL CONTENT

BACKGROUND

Users may consume digital content on electronic devices. Some digital content, such as text, may include a number of lines, paragraphs, pages, and the like. While consuming digital content, users may desire to increase reading speeds, or may desire guidance during consumption of digital content. However, some words or characters may be more difficult to consume than other words or characters. Users may therefore desire to increase reading speeds while accounting for difficulty of characters or words presented in digital content.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 5 is a schematic illustration of an alternate use case for dynamic character enhancement for rendering digital content in accordance with one or more example embodiments of the disclosure.

DETAILED DESCRIPTION

Overview

Figure 1:
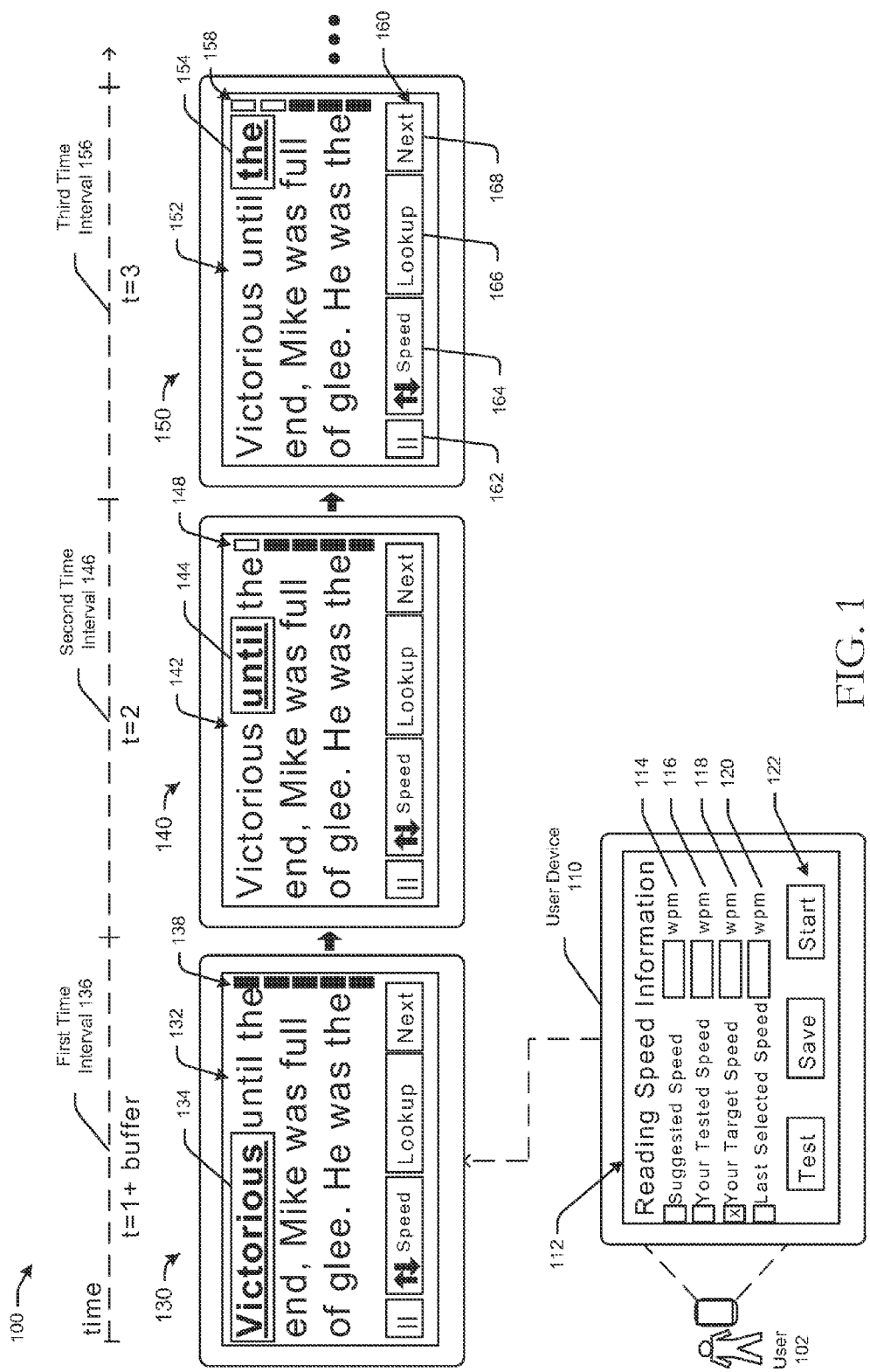
FIG. 1 is a schematic diagram of an example use case illustrating user inputs and resultant dynamic character enhancement for rendering digital content on a user device in accordance with one or more example embodiments of the disclosure.

This disclosure relates to, among other things, systems, methods, computer-readable media, techniques, and methodologies for dynamic character enhancement for rendering content. Users may consume digital content, such as text, on electronic devices, such as mobile devices (also referred to herein as "user devices"). Users may desire to improve the readability of digital content on a user device, and may desire to consume text at a certain reading speed. For example, users may desire to read text at a desired reading speed of 60 words per minute, at 2 words per second, or the like. Users may further desire to increase their reading speed over time. The systems, methods, computer-readable media, techniques, and methodologies for dynamic character enhancement for rendering content may improve readability of digital content and assist users in reading at a certain reading speed by drawing a user's attention to particular characters, images, or words in succession, such that not only is readability improved, but desired reading speeds can be achieved. For example, if a user wants to read certain text at 120 words per minute, the systems, methods, computer-readable media, techniques, and methodologies for dynamic character enhancement for rendering content described herein may draw the user's attention to a first word by providing an identifying marker or feature or otherwise distinguishing the first word from other text displayed to the user. The first word may remain marked for half a second, and then may be rendered or re-rendered in its original form, while the subsequent or second word is identified with the marker or other feature that distinguishes the second word from the other text displayed to the user. Some embodiments may not include identifying markers. Examples of identifying markers or features described herein include emboldening, weighting, underlining, italicizing, enlarging, changing a font, adding or removing serifs, changing a color, highlighting, adding a pointer or other marker, and the like. By continuing this process of identifying subsequent characters, images, or words and drawing the user's attention to the particular words in succession, readability of content may be improved, and/or desired reading speeds may be achieved.

Embodiments of the disclosure described herein may further provide time adjustments, which may be increases or decreases in time, for certain characters, images, or words in addition to a default time allotted per word based on a desired or selected reading speed. A time adjustment, as referred to herein, may be a time extension or reduction in time associated with a character or word for which a respective character or word is presented, in addition to a default or base time interval for the character or word. In some embodiments, but not all embodiments, a respective character or word may be presented with an identifying marker during the time interval for the character or word. For example, if a selected reading speed is 60 words per minute, embodiments of the disclosure may determine that each word of presented text is allotted a default time or base time interval of 1 second per word for consumption. However, certain embodiments may provide time adjustments which may be a positive time adjustment or extension for consuming certain characters or words, in addition to the default time. For example, certain words exceeding a threshold number of characters, such as 10 characters, or words exceeding a threshold word difficulty, may be provided a time adjustment of +0.2 seconds in addition to the default time of 1 second to provide the user with more time to consume the particular word. Word difficulty may be determined by one or more of a number of factors, and may be specific to a user. For example, word difficulty may be based at least in part on a number of possible definitions of the word, a length of the word, a frequency of the word in a portion of content or in a language generally, a relative difficulty of the word with respect to the content in which the word is presented, and/or user specific factors such as whether the user has previously requested a definition of the word, a reading level of the user, an age or age range of the user, and other user attributes or word difficulty metrics. After the default time and the time adjustment have passed, the word may be rendered in its original form and the subsequent word may be marked or otherwise distinguished. Some embodiments may compensate for the time adjustment by reducing the default time allotted for an easy word or words less than a threshold length of characters, such as 3 characters, or below a threshold word difficulty, such that an effective reading speed is equal to or approximately equal to the user's desired reading speed. Time adjustments may be determined or generated specific to users in some embodiments. For example, if a user has a reading level of $8^{th}$ grade, words or characters of a certain reading level (e.g., college level) may have time adjustments or time adjustments for that specific user. Further, time adjustments may be dynamic, in that one user may receive a time adjustment of 0.5 seconds for a certain word in certain content, while another user may receive a time adjustment of 1.5 seconds for the same word in the same content. Such dynamic time adjustments generated by certain embodiments described herein may be determined based at least in part on user attributes (e.g., age, reading level, previously read content, geographic location, etc.), user history (e.g., whether the user looked up a definition for the word previously, etc.), comparisons to similar users and related behaviors, and other factors.

Referring now to FIG. 1, an example environment 100 is illustrated with a user 102 and a user device 110. The user 102 may desire to consume content on the user device 110. Content, as used herein, may include any type of content that exists in the form of digital data and which is capable of being consumed. Example types of digital content may include, without limitation, electronic books ("e-books") or other electronic publications (e.g., magazines, comic books, Manga books, social media news feeds, documents, websites, other Internet content, etc.), or the like. Content may include text content, graphical content, audio content, video content, or the like, and may include information that is broadcast, streamed, or contained in computer files stored on a device configured to render the content. While example embodiments of the disclosure may be described in the context of e-books and/or electronic reader ("e-reader") devices, it should be appreciated that the disclosure is more broadly applicable to any form of digital content consumable on any suitable user device including, without limitation, a smartphone, a tablet, a wearable device, a content streaming device, a digital media consumption device, a video game console, a set-top box, or any other suitable device.

In FIG. 1, the user device 110 may present reading speed information 112 to the user 102. The reading speed information 112 may include information related to the user's 102 previous reading speeds, recommended reading speeds for the user and/or for particular content, one or more inputs for selecting or adjusting reading speed settings, and the like. For example, the reading speed information 112 may include a default speed 114. The default speed 114 may be indicative of a recommended reading speed for the particular content the user 102 desires to consume. In some embodiments, the default speed 114 may be determined by the user device 110 based at least in part on the type of content the user 102 desires to consume. For example, fictional content may have a relatively higher default reading speed than non-fiction content. The reading speed information 112 may include a tested speed 116. The tested speed 116 may be indicative of a reading speed the user 102 achieved during a reading speed test conducted by the user device 110. In some embodiments, the user device 110 may be configured to conduct or otherwise perform reading speed tests. A reading speed test may include presenting a passage or portion of text to the user 102 and determining a length of time the user 102 takes to complete reading the presented text. The user device 110 may calculate the reading speed by dividing the number of words in the presented text by the length of time the user 102 took to determine a tested reading speed. The user device 110 may associate the tested reading speed with the genre or type of content that was presented to the user 102 during the reading speed test, so as to generate accurate tested reading speeds for different types of content (e.g., fiction, informative, non-fiction, magazine, etc.). The reading speed information 112 may include a target speed 118. The target speed 118 may be a reading speed goal set by the user 102, or a reading speed at which the user 102 desires to achieve. In some embodiments, the target speed 118 may be determined or generated by the user device 110. For example, the target speed 118 may be an incremental increase from the last selected reading speed by the user 102 or the last tested reading speed for the user 102. The target speed 118 may, in some embodiments, be an average reading speed for the particular content aggregated across all users that consumed the content, or users that are similar to the user 102. The reading speed information 112 may include a last used speed 120 indicative of the last or most recent reading speed setting selected or used by the user 102. The reading speed information 112 may include one or more inputs 122. For example, in FIG. 1, the reading speed information 112 may include a "test" option for the user 102 to take a reading speed test, a "save" option for saving reading speed settings, and/or a "start" option for the user 102 to begin consuming content. Other embodiments may include additional, fewer, or different components or inputs in the reading speed information 112. Some embodiments may prompt a user for a length of time the user desires to complete the content in. For example, a user may wish to consume an electronic book in 2 hours. Embodiments of the disclosure may generate a reading speed recommendation based at least in part on the number of words in the content and the desired time to complete the content. While discussed in some examples and embodiments herein in the context of text and electronic books, embodiments of this disclosure may include webpages, web-based documents, social media and social media newsfeeds, and the like. For example, embodiments may facilitate consumption of text on a webpage and may automatically scroll a webpage up or down as content is consumed by a user. In another example, a web-based document, such as one uploaded to a document storage server, may be consumed with embodiments of the disclosure. In another example, a social media newsfeed may be presented and consumed via embodiments of the disclosure, which may facilitate consumption of the respective digital content by users.

The user 102 may use the user device 110 to consume digital content, such as text. In the illustrated embodiment, the user 102 may select or input a desired reading speed, and select "start" and be presented with the desired digital content. The desired reading speed may be input or selected in any suitable format indicative of a rate at which the user 102 desires to wants to read. Examples include words per minute, words per second, seconds per word, and the like. In some embodiments, the desired reading speed may be input as words per minute, and may be automatically converted to another metric, such as unit time per word, for example, by dividing the desired reading speed by a number of words in the content to be consumed. In FIG. 1, the user device 110 may render content at a first screen 130 depicted at a first timestamp, indicated by time along a horizontal axis. At the first screen 130, a portion of content 132 may be rendered on a display of the user device 110. The portion of content 132 may include one or more characters or words, and may be rendered in any suitable language, layout, and/or device orientation (e.g., landscape or portrait orientations). The user device 110 may assist the user 102 in reading the rendered content by drawing the user's attention to particular characters or words in order or succession, based at least in part on the user's desired reading speed. In FIG. 1, the user device 110 may identify or otherwise determine that a first character or a first word 134 (also referred to as "starting word") of the rendered portion of content 132 is "Victorious." Accordingly, the user device 110 may render the first word 134, in some instances with one or more identifying markers that distinguishes the first word 134 from the other rendered content 132, such that the user's attention is drawn to the first word 134. In the illustrated example, the user device 110 emboldens and underlines the first word 134 "Victorious," such that the user can easily identify the character and/or word that is to be consumed at any point in time. In some embodiments, the user device 110 may identify the word or character to be consumed by adding a marker near the word, changing a color of the word to make the word contrast with other words, or with other markers or combinations thereof, as described herein. While described in the content of content that includes characters and/or words, embodiments of the disclosure may include images, tables, charts, formulae, and other forms of content. In one example, embodiments of the disclosure may provide standard time intervals for inline graphics and/or embedded formulae, or may prompt a user to continue. Some embodiments may analyze a size or information density of such non-text content and generate time intervals for consumption based at least in part on size, complexity, and/or information density of non-textual content.

The first word 134 may be rendered with the identifying marker at the first screen 130 for a first time interval 136. During the first time interval 136, the other rendered content or words may be rendered with normal or default characteristics, such as a default font or font, size, color, and/or other characteristic associated with the content or operational mode of the user device 110. The other rendered content or words may have uniform characteristics, such that the first word 134 stands out or is otherwise distinguished or apparent from the other text. As a result, the user 102 may quickly identify the first word 134 and may consume the word with the identifying marker.

The first word 134 may remain identified as illustrated in the first screen 130 for the first time interval 136. The first time interval 136 may include a default time allotted for a word. The default time may be determined by the user device 110 based at least in part on the reading speed selected by the user 102 or otherwise determined by the user device 110. For example, the user device 110 may determine that a desired reading speed is 60 words per minute, and as a result, each word has a default time allotment of 1 second for consumption.

In some instances, time intervals associated with one or more characters or words may include a time adjustment in addition to the default time. Time adjustments or time adjustments may increase or decrease the default time by a specific amount or length of time. Durations of time adjustments may be determined by embodiments described herein based at least in part on characteristics of a particular word or character, positioning of a character or word on a display or layout of content, user attributes, historical user actions, and other factors. For example, the user device 110 may determine a time adjustment for words having a length of over a certain number of characters, or for words having at least a certain number of possible definitions. Other examples include time adjustments for words of a non-native language as determined based on user attributes or geographic location, words having a complexity or reading level greater than a user's reading level, words a user has previously requested assistance on or looked up a definition for, words at the start or end of a paragraph or page, among other examples. In one particular example, if a user device is located in Atlanta, Ga., and/or a user account is primarily associated with digital content in English, and the user associated with the user account is consuming content in Japanese, the user may be unfamiliar with the Japanese language and a time adjustment that increases a presentation time interval may be generated for some or all characters presented to the user so as to accommodate the user's unfamiliarity. In another example, if the Japanese content the user is consuming is significantly below the user's average reading level as indicated by historical user data, time adjustments may be generated for some or all of the characters presented to the user. In FIG. 1, the user device 110 may determine that the first time interval 136 includes the default time and a time adjustment because the first word 134 has a number of characters at or over a threshold of 10 characters. The user device 110 may further determine that the first word 134 has a difficulty greater than the user's 102 reading ability. Accordingly, the first time interval 136 may include the default time and the time adjustment to provide the user 102 sufficient time to consume the first word 134.

Time adjustments for certain words or characters may also reduce the default time for a word or be negative. For example, for relatively short words (e.g., word less than 3 characters, etc.) such as "at," the user device 110 may reduce the default time so as to achieve an overall or effective reading speed approximately equal to, or equal to, the desired reading speed. Other examples of characters or words for which the time adjustment may reduce the default time include common words, such as "the," "or," "I," "a," and others. The user device 110 may dynamically adjust time adjustments for particular users over time. For example, the first time a user is presented with a word having a relatively high complexity or difficult, the time adjustment may be 100% of the default time, giving the user double the default amount of time to consume the word. The fifth time the same word is presented to the user, however, the user device 110 may generate a time adjustment of 20% of the default time, because the user may be more comfortable or familiar with the word. Time adjustments may be language-specific, in that certain characters or words in certain languages may be allotted time adjustments, while the same characters or words in different languages may not be allotted a time adjustment. Character based languages may also have time adjustments specific to certain characters or positioning of characters on a display compared to other languages. Additional examples are described herein.

A first visual indicator 138 may be presented to the user 102 representing a total amount of time that the user 102 has to consume the portion of content 132 based at least in part on the desired or target reading speed. The visual indicator may change as time elapses. The first visual indicator 138 may be a graphical representation of time remaining for consumption of the portion of content 132. Although illustrated as a bar indicator, other embodiments may include visual indicators such as background color transitions (e.g., from green to yellow to red, etc.), a countdown timer, and other visual indicators.

Upon completion of the first time interval 136, the user device 110 may render a second screen 140 depicted at a second timestamp. As illustrated, the second screen 140 may include a portion of content 142, which may be the same portion of content 132 as the first screen 130. The first word 134 may be rendered with the default or normal characteristics, and may not include the identifying marker or markers associated with the first word 134 in the first screen 130. In the second screen 140, a second word 144 may be rendered with identifying markers. The second word 144 may be the word immediately subsequent to the first word 134. The identifying markers of the second word 144 may be the same as, or different than, the identifying markers of the first word 134 in the first screen 130. The second word 144 may, for example, be emboldened and underlined as illustrated, so as to draw the user's attention to the second word 144. The second word 144 may remain rendered with the identifying markers for a second time interval 146. The user device 110 may determine that the second word 144 is not associated with a time adjustment, or does not otherwise meet a time adjustment criteria, so the second time interval 146 may equal the default time. Accordingly, the second word 144 may be rendered with or otherwise presented with the identifying markers for the duration of the second time interval 146. As shown in FIG. 1, a second visual indicator 148 may indicate to the user 102 the time remaining for consumption of the portion of content, which accounts for the elapsed time from the time the user 102 started consuming the presented content.

Upon completion of the second time interval 146, which may be different in length than the first time interval 136, the user device 110 may render a third screen 150 depicted at a third timestamp. As illustrated, the third screen 150 may include a portion of content 152, which may be the same portion of content 132, 142 as the first screen 130 or the second screen 140. The first word 134 and the second word 144 may be rendered with the default or normal characteristics, and may not include the identifying marker or markers associated with the first word 134 or the second word 144 in the respective first screen 130 and second screen 140. In the third screen 150, a third word 154 may be rendered with identifying markers. The third word 154 may be the word immediately subsequent to the second word 144. The identifying markers of the third word 154 may be the same as, or different than, the identifying markers of the first word 134 in the first screen 130 or the second word 144 in the second screen 140. The third word 154 may, for example, be emboldened and underlined as illustrated, so as to draw the user's attention to the third word 154. The third word 154 may remain rendered with the identifying markers for a third time interval 156. The user device 110 may determine that the third word 154 is not associated with a time adjustment, or does not otherwise meet a time adjustment criteria, so the third time interval 156 may equal the default time. Accordingly, the third word 154 may be rendered with or otherwise presented with the identifying markers for the duration of the third time interval 156. A third visual indicator 158 may represent the remaining time the user 102 has to consume the remaining content of the presented portion of content. Some embodiments may not include identifying markers and may include words presented for their respective time intervals (e.g., base time interval and any time adjustment) without identifying markers.

Upon completion of the third time interval 156, the user device 110 may continue to render screens with identifying markers for successive characters or words to assist in readability and in drawing user attention. For each character or word, the user device 110 may determine time adjustments to determine a length of time to provide the user for consumption of the word. The user device 110 may continue this process until reaching the last word or character displayed on the user device 110. Upon rendering the last word of the content with the identifying markers, the user device 110 may wait for the user 102 to indicate a transition to a subsequent page, or may automatically scroll to display additional content. For example, as illustrated on each of the first, second, and third screens, 130, 140, 150, the user device 110 may present one or more options 160 to the user 102 during consumption of content. In FIG. 1, the options 160 may include a "pause" option 162 to pause the user device 110 at a current screen, a speed adjustment option 164 to increase or decrease a desired reading speed, a "lookup" option 166 to seek further information, such as a definition, of the word with identifying markers at the time the option is selected or to trigger display of supplemental content, and a "next" option 168 to indicate a transition to a subsequent page or portion of content. The "next" option 168 may prevent the user device 110 from automatically moving to a subsequent portion of the content if the user 102 happens to leave the user device 110 temporarily and does not pause or stop the user device 110.

Example embodiments of the disclosure provide a number of technical features or technical effects. For example, in accordance with example embodiments of the disclosure, characters or words of digital content may be identified and generated with identifying markers so as to make particular characters or words relatively easier to identify and/or consume. In accordance with certain example embodiments of the disclosure, subsequent characters or words may also identified and generated in succession, such that a user is assisted in reading or consuming content at a desired reading speed. Example embodiments may further generate one or more time adjustments to a length of time allotted for consumption of one character or word. Time adjustments may be positive or negative and may be determined based at least in part on factors such as user attributes, character or word characteristics, comparisons to similar users, target reading speeds, and other factors in accordance with certain example embodiments of the disclosure. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

The above-described embodiments and additional and/or alternative embodiments of the disclosure will be described in detail hereinafter through reference to the accompanying drawings.

Illustrative Process and Use Cases

Figure 2:
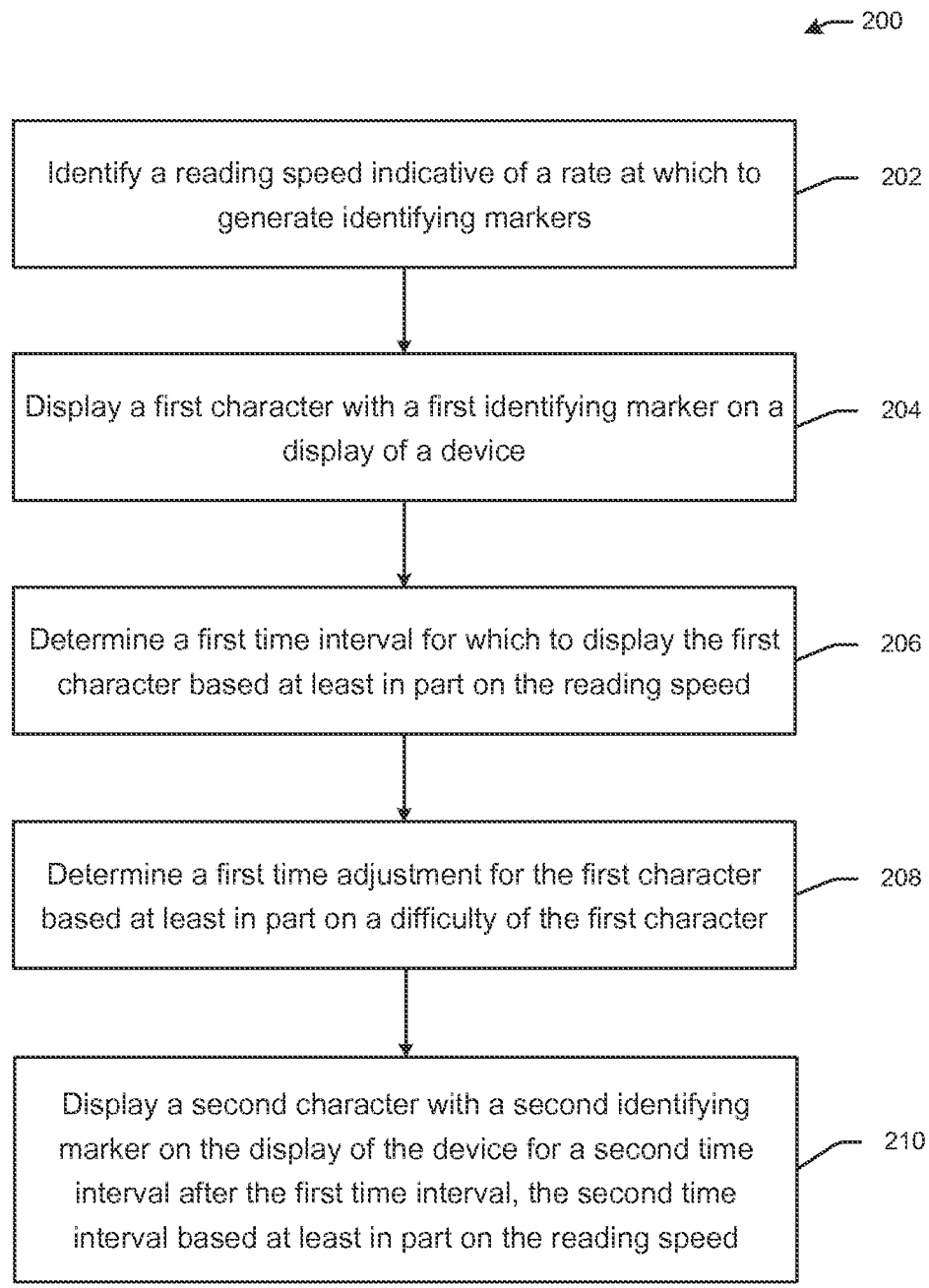
FIG. 2 is a process flow diagram of an illustrative method for dynamic character enhancement for rendering digital content in accordance with one or more example embodiments of the disclosure.
Figure 3:
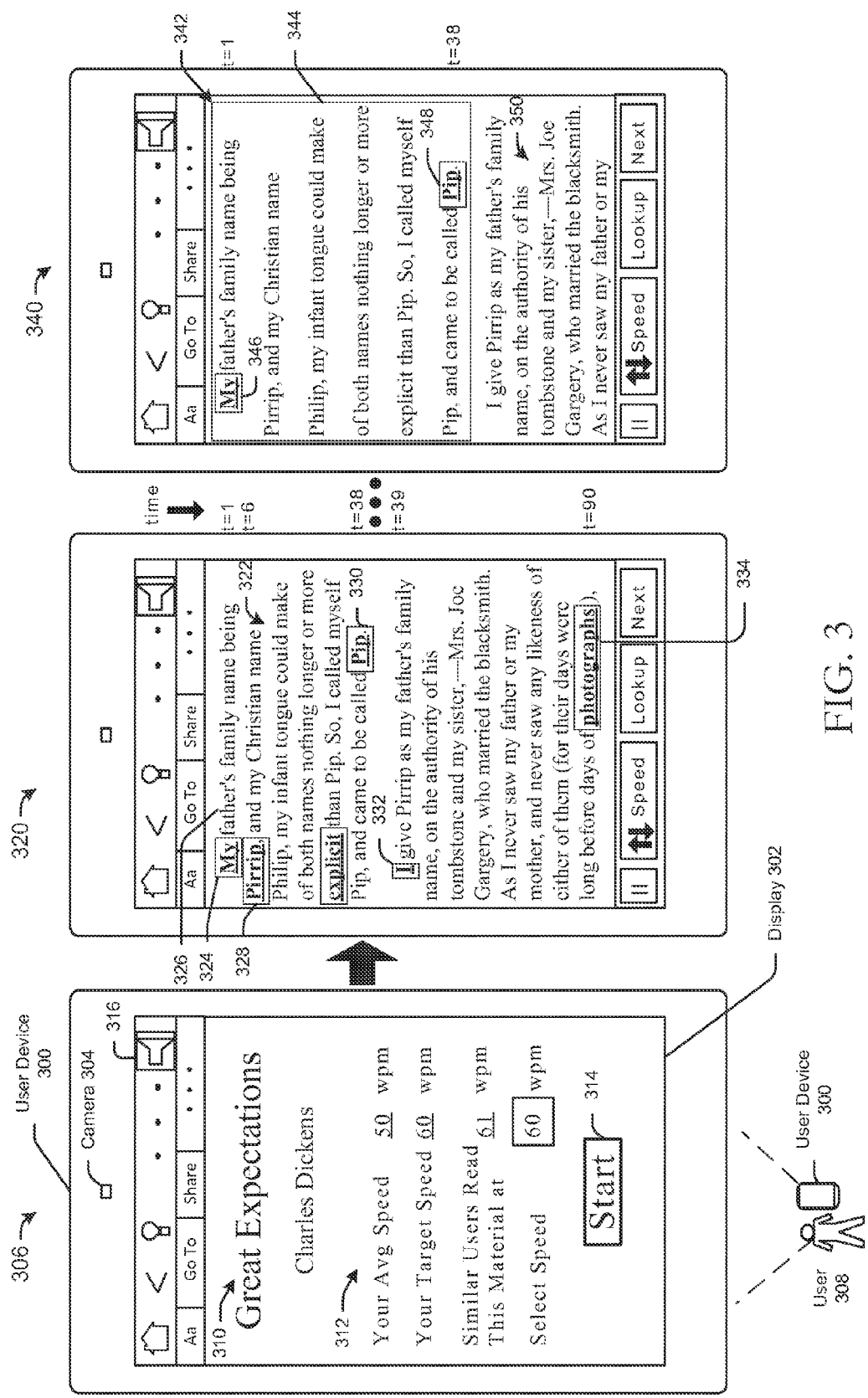
FIG. 3 is a schematic illustration of two example use cases and user interface depictions for dynamic character enhancement for rendering digital content in accordance with one or more example embodiments of the disclosure.

FIG. 2 is a process flow diagram of an illustrative method 200 for dynamic character enhancement for rendering digital content in accordance with one or more example embodiments of the disclosure. FIG. 3 illustrates two example use cases for dynamic character enhancement for rendering digital content in accordance with the method 200 of FIG. 2, and will be discussed in conjunction with the description of FIG. 2.

Figure 6:
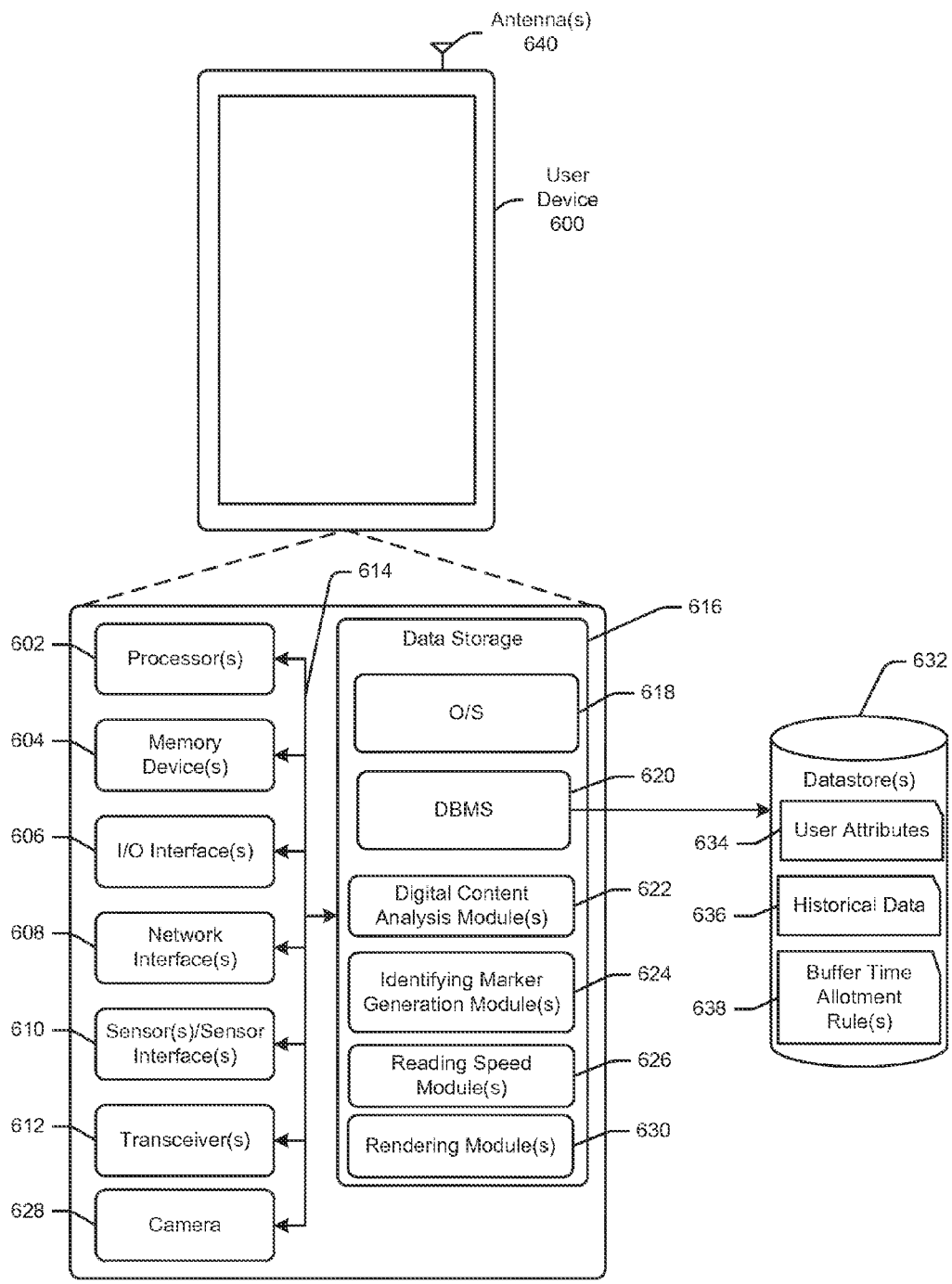
FIG. 6 is a schematic block diagram of an illustrative user device in accordance with one or more example embodiments of the disclosure.

At block 202 of the method 200 in FIG. 2, computer-executable instructions of one or more module(s) stored on a memory of a user device may be executed to identify a reading speed indicative of a rate at which to generate identifying markers. Example device architecture, including modules, is illustrated in FIG. 6.

In FIG. 3, an example user device 300 is depicted. The user device 300 may include a display 302 and a camera 304. The user device 300 may be, for example, the user device 110 of FIG. 1. The user device 300 may present a first user interface 306 to a user 308. The first user interface 306 may present content information 310, which may be indicative of, or associate with, digital content selected for consumption by the user 308. For example, in FIG. 3, the content information 310 presented to the user 308 by the user device 300 may indicate that the user 308 desires to consume "Great Expectations." The user device 300 may further present reading speed information 312 on the display 302. The reading speed information 312 may include information such as an average reading speed of the user, a target reading speed of the user, information related to reading speeds of "Great Expectations" by users similar to the user 308, and the like. The user device 300 may present an option or input 314 to start reading "Great Expectations" or to otherwise begin consuming content. The user device 300 may present an audible input 316 which may enable an audible playback of one or more recordings associated with the digital content. For example, words or definitions of words may be recorded and associated with content for playback by users. In some embodiments, an estimated time to completion, based at least in part on a reading speed and a number of characters or words in the content may be presented to a user.

Some or all of the reading speed information 312 may be determined by the user device 300 or may be received from a remote server in response to a request from the user device 300. For example, the user device 300 may analyze historical data associated with the user 308 to determine an average reading speed of the user 308. The average reading speed may be specific to a certain type of content (e.g., textbook, magazine, etc.), genre (e.g., fiction, non-fiction, etc.), and the like, so as to determine an accurate average reading speed for the user 308.

The target reading speed may be determined by the user device 300 or by a remote server as being a goal set by the user 308, or an incremental increase from an average reading speed or most recent reading speed, or combination thereof, to bring the reading speed closer to a goal set by the user 308. For example, in FIG. 3, the user 308 may have an average reading speed of 50 words per minute for fictional books. The user 308 may have a goal reading speed of 70 words per minute for fictional books. Accordingly, the user device 300 may determine that the last reading speed at which the user 308 consumed a fictional book was 55 words per minute, and may suggest a recommended reading speed, or target reading speed, of 60 words per minute. In certain embodiments, the target reading speed may be the reading speed goal of the user 308. Recommended reading speeds may also be determined or generated by the user device 300 by analyzing reading speeds of other users that have consumed the content. For example, the user device 300 may generate a summary of the user's average reading speed for the content, and may further generate an indication of the user's average speed compared to the average reading speed of other users, which may be all users, or a subset of users similar to the user themselves (e.g., similar age, location, reading level, etc.). Embodiments of the disclosure may further generate recommendations or suggestions regarding device brightness settings, device orientation, font size, background color, or other device settings to facilitate increased reading speed. For example, a landscape device orientation may facilitate faster reading speeds, or a white background color may provide better contrast for a user.

In another example, the target reading speed may be based at least in part on results of a reading speed test completed by the user 308. For example, the user device 300 may present text for the user 308 to read and may monitor a length of time the user 308 takes to complete reading of the text. The user device 300 may determine the user's reading speed based on the number of words presented to the user, the time to complete reading, and/or a difficulty or complexity and/or type/genre of the presented text. In another embodiment, the user device 300 may use the camera 304 to observe eye movements of the user 308 to estimate or determine a length of time it takes the user's eyes to move across a line of text. Specifically, the user device 300 may detect a user reading speed by using the camera 304 to track eye movement of the user 308, and may generate a recommendation for a target reading speed based at least in part on the detected reading speed.

The reading speed of similar users may be determined by the user device 300 sending a request to a remote server for aggregate reading speed information associated with the content, which in FIG. 3 is "Great Expectations." The remote server may receive the request, and may either send the user device 300 an average reading speed aggregated across all readers of the content, or may generate a specific average reading speed for users similar to the user 308 based at least in part on user attributes. For example, the remote server may determine that the user 308 is between 15-18 years old and may generate average reading speeds for users within the same age range. In some embodiments, average reading speeds for similar, but not identical, content may be generated, for instance when insufficient data is available. In another example, the remote server may determine, based on a user account associated with the user 308, that the user 308 has a reading level of $11^{th}$ grade, and may generate average reading speeds for similar users (e.g., $11^{th}$ grade, a range between $10^{th}$-$12^{th}$ grade, etc.). If the user 308 selects a desired reading speed that is below an aggregated average reading speed, the user device 300 may automatically enable one or more functions to assist the reader or user 308 in consuming the content. Example functions may include audible assistance, such as that provided by option 316, definition popups or presentation for some or all words, or other supplemental content to facilitate reading and comprehension of the content by the user 308. In some embodiments, the user device 300 may perform some or all functions described in the context of the remote server locally.

The user 308 may select or input a desired reading speed at an input of the reading speed information 312 and may commence consuming the content by selecting option 314.

The user device 300 may transition to another page or screen/user interface and render the selected content, which in FIG. 3 is "Great Expectations."

At block 204 of FIG. 2, the method 200 includes displaying a first character with a first identifying marker on a display of a device. Referring to FIG. 3, at a second user interface 320, the user device 300 may present a portion of the digital content 322 on the display 302. Time is indicated along a vertical axis in FIG. 3 with various timestamps identified. The user device 300 may display a first character or first word 324 of the digital content 322 with one or more identifying markers. For example, in FIG. 3, at timestamp t=1, the user device 300 may present the word "My" in a color different than the other displayed words of the content 322, and/or may embolden, weight, underline, color, and the like, to identify the first word 324 of the content 322 to facilitate reading of the content 322 by the user 308. While the first word 324 is rendered or presented with the identifying marker(s), the rest of the content 322 may be presented with default, original, or uniform characteristics. Other examples of identifying markers include, but are not limited to, marking, emboldening, highlighting, italicizing, enlarging, weighting, and coloring. While the illustrated user interface 320 has more than one word with identifying characteristics, the various illustrated words may appear at various timestamps, and may not occur simultaneously. In some embodiments, however, more than one word may appear with identifying markers simultaneously or for overlapping time intervals.

At block 206 of FIG. 2, the method 200 includes determining a first time interval for which to display the first character based at least in part on the reading speed. In FIG. 3, the user device 300 may determine that the user 308 has a desired reading speed of 60 words per minute, and may calculate therefrom a default time of 1 second per word during which a word will be rendered with one or more identifying markers. In FIG. 3, the user device 300 may determine that the first word 324 is to be rendered or displayed with identifying markers for a first time interval of 1 second. Time intervals illustrated in FIG. 3 may be any unit of time, and any specific length of time. For example, a time interval of 1 unit may be equivalent to 0.8 seconds, 2 seconds, or another length of time and may be specific to users and/or user devices.

Block 208 of the method 200 includes determining a first time adjustment for the first character based at least in part on a difficulty of the first character. A time adjustment, as described herein, may be generated for the first character based at least in part on a difficulty of the character, which may be relative to the content in which the character appears, to the user, a language generally, a position of the character on a display of a device, or another factor. The time adjustment may be added to the first time interval to compensate or otherwise account for difficulty of the character or word and to provide a user with additional time to consume the character or word. As described herein, time adjustments may be negative and may reduce default time intervals so as to account for time adjustments that extend default time intervals, thereby equaling or approximating a desired reading speed.

Block 210 of the method 200 includes displaying a second character with a second identifying marker on the display of the device for a second time interval after the first time interval, the second time interval based at least in part on the reading speed. In FIG. 3, at timestamp t=2 of the second user interface 320, the user device 300 may render a second word 326, or "father's" with a second identifying marker (not shown) for a second time interval after the first time interval. The second word 326 may be immediately subsequent to the first word 324. While the second word 326 is rendered with the second identifying marker, the first word 324 may be rendered with default or original characteristics so the user 308 is no longer drawn to the first word 324. In one example, the first word 324 may be displayed in a first color and the second word 326 may be displayed in a second color during the first time interval, and the first word 324 may be displayed in the second color and the second word 326 may be displayed in the first color during the second time interval.

The user device 300 may continue to present characters or words in succession until reaching an end of, for example, a paragraph, an end of a page, and/or an end of the displayed content. In some instances, the user device 300 may determine time adjustments indicative of an adjustment to a time interval during which a particular character or word is displayed. For example, in the second user interface 320 depicted in FIG. 3, at timestamp t=6 (5 time intervals after t=1), the user device 300 may determine that the word "Pirrip" 328 is a first word in a new line of text, or a starting word for a line of text, and as a result, may increase the time interval during which "Pirrip" is rendered with identifying markers by a time adjustment. Similarly, at timestamp t=38, the user device 300 may determine that the word "Pip" 330 is a last word of a paragraph, and may increase the time interval by a time adjustment during which "Pip" 330 is rendered with identifying markers. The user device 300 may determine, at timestamp t=39, that "I" 332 is the first word of a paragraph, and may increase the time interval by a time adjustment during which "I" 332 is rendered with identifying markers. The user device 300 may determine a positioning of a character or word, which may be based at least in part on a layout of the content, in order to determine whether a time adjustment should be provided for the character or word. In some embodiments, although "I" 332 is the first word of a paragraph, the time interval associated therewith may not be increased due to the relatively short number of characters in the word. Certain embodiments may render "Pip" 330 and "I" 332 both with identifying markers for an overlapping length of time so as to ease the user 308 in transitioning from the end of one paragraph to the start of another. In addition, certain embodiments of the disclosure may determine whether to provide a time adjustment or may determine a length of time to provide based at least in part on a number of lines in a paragraph immediately preceding a word. For example, if the number of lines in an immediately preceding paragraph meet a threshold, such as 10 lines, the first word of the following paragraph may be given a longer positive time adjustment relative to other instances of the word due to the length of the preceding paragraph. The user device 300, at timestamp t=90, may render "photographs" 334 for an increased time interval with a time adjustment, or indefinitely until the user 308 indicates a transition to a subsequent portion of text.

In an alternative embodiment, or in addition to the embodiment illustrated in FIG. 3, a third user interface 340 is depicted. In the embodiment of the third user interface 340, in addition to rendering characters or words with identifying markers in succession, the user device 300 may determine default characteristics, such as a font, line spacing, and the like, for rendering content 342. The user device 300 may identify a portion 344 of the rendered content 342, such as the first paragraph, as shown in the third user interface 340. The user device 300 may render the identified portion 344 with a first characteristic that is different that the default characteristics. For example, as illustrated, the rendered content 342 may have a default line spacing of single spacing, indicated by the content 342 other than the identified portion 344. The user device 300 may render the identified portion 344 in double spacing as shown, so as to make the characters or words included in the identified portion 344 easier to read for the user 308. At timestamp t=1, the user device 300 may render a first word 346 in a boldface font, for example, that may be associated with a default font of the content 342. The user device 300 may also render, during a first time interval, the first word 346 with an underline positioned under the first word 346 or a marker positioned on top of the first word 346. The user device 300 may continue generating identifying markers for characters or words in succession until reaching the end of the identified portion 344. When a time interval for a particular character or word is complete, the word or character may be rendered with default characteristics and without the identifying markers. At timestamp t=38, the user device 300 may render "Pip" 348 with the identifying marker and may increase the time interval for "Pip" 348 by a time adjustment. Upon completion of the identified portion 344, the user device 300 may render the identified portion 344 with the default characteristics (e.g., single line spacing), and may identify a subsequent portion 350 of the content 342 to render with characteristics different than the default.

Figure 4A:
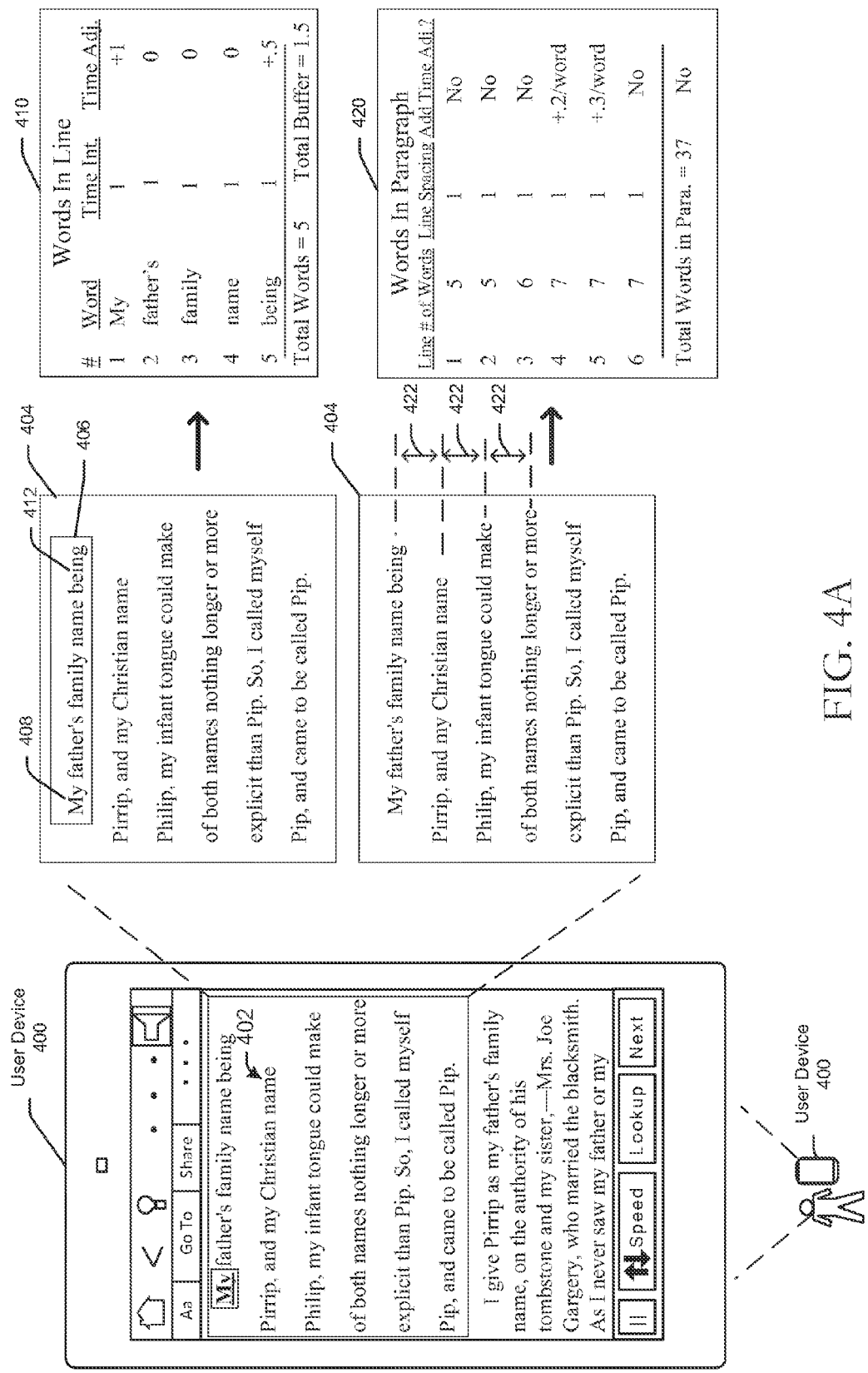
FIG. 4A is a schematic illustration of a digital content analysis of the use case of FIG. 3 in accordance with one or more example embodiments of the disclosure.

FIG. 4A illustrates an example digital content analysis that may be performed by embodiments of the disclosure. A user device 400 may determine a device orientation, content layout, content language, and the like in order to render content 402. In implementing the systems and methods for dynamic character enhancement for rendering digital content described herein, the user device 400 may render content periodically, for example every 10-15 milliseconds. In the illustration of FIG. 4A, the user device 400 may render the content 402. In determining time intervals for one or more characters or words for which to generate identifying markers, the user device 400 may perform digital content analysis. In some embodiments, the user device 400 may receive or otherwise have access to some or all of the information resulting from the digital content analysis.

In FIG. 4A, the user device 400 may analyze a first portion 404 of the content 402 to generate a first digital content analysis results 410. Specifically, the user device 400 may analyze the first portion 404 to determine a number of words in a specific line. By analyzing a first line 406, for example, the user device 400 may determine that the first line 406 has 5 words. The user device 400 may generate default time intervals for each word based at least in part on a desired reading speed. The user device 400 may further generate time adjustments for one or more of the words in the first line 406. For example, the user device 400 may determine that a first word 408 of the first line 406 is a first word of a paragraph and a first word of a page, and may therefore determine a time adjustment of +1 associated with the first word 408. The user device 400 may determine that the fifth word 412 of the first line 406 has a time adjustment of +0.5 because the fifth word 412 is the last word in the first line 406. As part of the first digital content analysis results 410, the user device 400 may generate totals for the number of words in a line and totals of time adjustments that may be used to determine an overall reading speed for the user. For example, the user device 400 may compensate for the allotted time adjustment by reducing time intervals for relatively easy or easier or, in one example, shorter words.

In some instances, the user device 400 may further determine intercharacter spacing between characters of words, or interword spacing in between adjacent words, to determine whether a positive time adjustment should be allotted, and if so, how much time should be allotted. Time adjustments may also be determined based at least in part on a language of the character or word. For example, a user residing in America or having a user history associated with content in English may be provided additional time for content rendered in Chinese. Certain embodiments may further provide time adjustments for words or characters in lines following a line having a number of words that meets a line length threshold. For example, if a line length threshold is 10 words, and a line is determined to have 12 words, the first word in the subsequent line may be provided with a time adjustment or an additional positive time adjustment to assist readers or users in identifying the subsequent word. Time adjustments may further be based at least in part on word difficulty. In one embodiment, time adjustments may be based on a word meeting a difficulty threshold. The difficulty threshold may be, in some embodiments, based at least in part on a number of characters in the word, a contextual difficulty of the word, a lexile or comprehension score, or the like.

As shown in FIG. 4A, the digital content analysis may generate second digital content analysis results 420. The user device 400 may analyze the first portion 404 of the content 402 to determine a total number of words in each line, a total number of words in the first portion 404, and/or a line spacing in between one or more of the lines in the first portion 404. Time adjustments may be generated for words positioned at lines having a line spacing below a predetermined amount. For example, the user device 400 may determine that the line spacing between the first line, second line, and third line is consistent at line spacing 422, and that no time adjustment is to be generated due to line spacing. The user device 400 may further determine whether, based on the number of words per line, time adjustments should be generated. For example, because lines 4 and 5 have at least one word with a length of 7 or more characters, the user device 400 may generate a time adjustment for one or more words in the respective lines. The user device 400 may further determine whether a time adjustment should be generated because of a number of words in paragraph meeting a threshold.

Figure 4B:
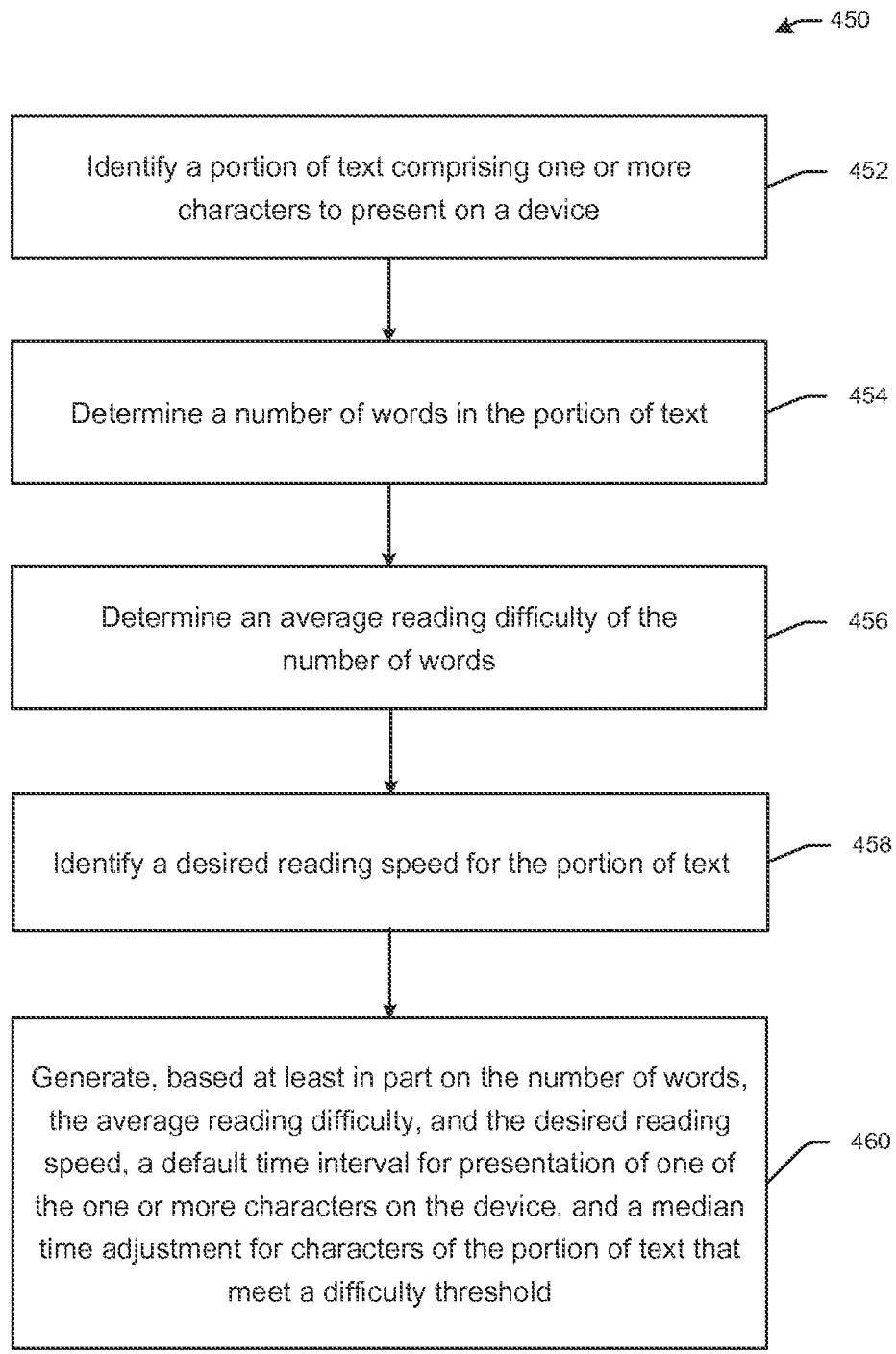
FIG. 4B is a process flow diagram of an illustrative method for generating a time adjustment for one or more characters in accordance with one or more example embodiments of the disclosure.

FIG. 4B is a process flow diagram of an illustrative method 450 for generating a time adjustment for one or more characters in accordance with one or more example embodiments of the disclosure. Some embodiments may not include the identifying markers described herein. In some embodiments, the method 450 may generate word-specific time adjustments relative to other characters or words in a particular portion of digital content. At block 452 of the method 450, computer-executable instructions of one or more module(s) stored on a memory of a user device may be executed to identify a portion of text comprising one or more characters to present on a device. The portion may include one or more characters or words and may be identified based at least in part on a starting word or starting character and/or an ending word or ending character. Starting and/or ending words or characters may be language-specific, in that certain languages may be presented in different orientations or reading orders and may have different characters. For example, English content may be presented in words formed of characters with a reading order of left to right, while Arabic content may be presented with a reading order of right to left with interconnected characters and Japanese may be presented with characters that may represent words.

Other languages may be presented in and up/down format. Accordingly, starting or ending characters or words may be identified specific to a language of the content presented.

At block 454, computer-executable instructions of one or more module(s) stored on a memory of a user device may be executed to determine a number of words in the portion of text. For example, the portion of text may be the content presented on a display of a device. The number of words in the portion of text may be determined based at least in part on the starting character and ending character of the text. The number of words may be the total number of characters or words included in the portion of text, including the starting word or character and the ending word or character.

At block 456, computer-executable instructions of one or more module(s) stored on a memory of a user device may be executed to determine an average word or character difficulty of the number of words of the portion of text. For example, each word or character included in the portion of text may be associated with a word difficulty. As described herein, the word difficulty may be general to a language, or specific to content or to a user. The average word or character difficulty may be determined by combining a difficulty score for each word in the portion of text and dividing by the number of words or characters included in the portion of text. In some embodiments, an average word difficulty may be determined for an entire piece of content, such as an electronic book, or the average word difficulty may be identified via information associated with particular content. In some instances, digital content may include reference information that identifies word difficulty. In one example, classification content may accompany the digital content. For instance, when a publisher makes an e-book available for acquisition, the publisher may include classification content with the e-book. Classification content may include measures of a difficulty level of the different words within the text of the e-book, the relative importance of the different words within the text in the context of the book and/or other information. In other instances, classification content may be obtained from a third-party source. For instance, a reference source may maintain, for example, difficulty levels of respective words, and a device or the other entity may identify the words within the digital content and identify, from the reference source, the corresponding difficulty level of the words. In still other instances, a device or another entity (e.g., the entity that offers the digital content) may actually calculate, for example, the relative importance of the different words within the context of the digital content. Example embodiments may include a general word ranking module 402 that may operate to provide a general or non-contextual ranking or score for each of a plurality of words in digital content. In some implementations, the ranking or score of a word provided by the general word ranking module may be indicative of a relative difficulty and/or importance of the word among the plurality of words. For example, in some implementations, the general word ranking module may assign such a ranking or score to the each word of a language. A difficulty ranking or difficulty value of a particular word may be based at least in part on a frequency of the term within the digital content. For example, in a book about the production of energy in plants, the word "photosynthesis" may be determined to be more likely to be known or not as difficult as the word might be evaluated to be in another context. In other words, a second language reader of a biology book is more likely to know the second language word for the biology word, "photosynthesis," even though "photosynthesis" may be above a reader's general reading level or may otherwise appear to be difficult. The balancing of the importance and difficulty factors may vary from implementation to implementation. A difficulty value for a character or a word may also be determined, in some implementations, based at least in part on the relative frequency the word appears within a corpus of written materials, which may be related to a particular subject area. As mentioned above, a reader reading a second language biology e-book is more likely to know the second language word for "photosynthesis" than a reader of a mystery novel that includes the word "photosynthesis" in a technobabble explanation. As such, the word "photosynthesis" may have a lower difficulty value for digital content related to biology due to its higher frequency of occurrence in a corpus of biology digital content relative to a corpus of content from all subject areas.

At block 458, computer-executable instructions of one or more module(s) stored on a memory of a user device may be executed to identify a desired reading speed for the portion of text. For example, the desired reading speed may be based at least in part on an input by the user, a recommended reading speed, a target or goal reading speed, or another reading speed.

At block 460, computer-executable instructions of one or more module(s) stored on a memory of a user device may be executed to generate, based at least in part on the number of words, the average word difficulty, and the desired reading speed, a default time interval for presentation of one of the one or more characters on the device, and a median time adjustment for characters of the one or more characters of the portion of text that meet a difficulty threshold. The portion may be an entire electronic book, a chapter, a page, a paragraph, or another portion of the content, another portion of a webpage (e.g., that must be scrolled in order to consume, etc.), a social media newsfeed for a subsequent friend, or another portion. In one example, embodiments of the disclosure may determine a default time interval for a word or character in a chapter or other portion of content. The difficulty threshold may be relative to an average word difficulty, which may be represented as an average word difficulty value or numerical representation, and/or based at least in part on another difficulty metric. For example, if the average difficulty value for a character of the portion of text is identified as a score of 5/10, the difficulty threshold may be 7/10, and every character or word having a difficulty of at least 7/10 may be provided with the median time adjustment. In some embodiments, the median time adjustment may be adjusted based at least in part on the difficulty of a specific character or word. In one example, a desired reading speed may be 60 words per minute, such that the default time interval for each word is 1 second. The median time adjustment may be determined to be 0.5 seconds, which may account for the average difficulty, as indicated by the average word difficulty value, of characters or words forming the portion of content. The difficulty threshold may be characters or words having a difficulty score of 7/10. However, for characters or words having a difficulty score of 10/10, the time adjustment may be 0.9 seconds, and for characters or words having a difficulty score of 6/10, the time adjustment may be 0.1 seconds, so as to achieve a median time adjustment of 0.5 seconds. Embodiments of the disclosure may use the median time adjustment to estimate or otherwise determine a reduction in time intervals associated with words below a certain difficulty threshold, so as to "make up" for time adjustments provided and to maintain the desired reading speed. For example, words or characters such as "a" or "the" may be presented with identifying markers for 0.5 seconds, which is less than the default time interval of 1 second, to make up for the time adjustments provided for words that meet or exceed the difficulty threshold.

In some embodiments, embodiments may determine an amount or length of time a portion of content, such as a page, may take to consume. Embodiments of the disclosure may determine an amount or length of time each word in the portion of content may take to consume based at least in part on the desired or target reading speed. For example, for each word, the length of time for consumption may be determined by determining a base time interval for the word and adding or subtracting the word-specific time adjustment, where the word-specific time adjustment is based at least in part on the a difficulty of the word with respect to an average difficulty of the words in the portion of content. The average difficulty of words in the content and average difficulty value may be based at least in part on a number of words in the content, a font size, a margin size, an amount of non-textual content in the portion of content, such as images or tables, etc. Embodiments may divide the page render time by a numerical value (e.g., 4, 10, etc.).

FIG. 5 depicts an alternate embodiment of the disclosure. In FIG. 5, a user 500 may desire to consume content on a user device 502. However, rather than rendering content and generating identifying markers for characters or words in succession, the user device 502 may render a single character or word on a display 504 of the user device 502 for the appropriate time interval, and then may render the subsequent character or word on the display 504 upon completion of the first time interval. The user device 502 may or may not generate identifying markers with the rendered characters or words. For example, at a first screen 506, the user device 502 may render a first word 508 for a first time interval 510. Upon completion of the first time interval 510, which may include a positive time adjustment, the user device 502 may render a second word 512 at a second screen 514 during a second time interval 514 following the first time interval 510. Upon completion of the second time interval 514, which may include a time adjustment, the user device 502 may render a third word 516 at a third screen 518 during a third time interval 520 following the second time interval 514. In FIG. 5, another example of an identifying marker is depicted. As shown, the user device 502 may generate one or more serifs for characters or words as identifying markers. In these embodiments, words or characters without identifying markers may be rendered or displayed without serifs. An example serif 522 is illustrated in the second word 512. Serifs may be small lines attached to the end of a stroke in a letter or symbol. Although illustrated with left-justified text in FIG. 5, other embodiments may include different justification, such as centered or right-justified text.

One or more operations of the method 200 or use cases of FIGS. 3-5 may have been described above as being performed by a user device, or more specifically, by one or more program modules, applications, or the like executing on a device. It should be appreciated, however, that any of the operations of method 200 or use cases of FIGS. 3-5 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 200 or use cases of FIGS. 3-5 may be described in the context of the illustrative device 300, 400, 502, it should be appreciated that such operations may be implemented in connection with numerous other device configurations.

The operations described and depicted in the illustrative method and use cases of FIGS. 2-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

FIG. 6 is a schematic block diagram of an illustrative user device 600 in accordance with one or more example embodiments of the disclosure. The user device 600 may include any suitable computing device including, but not limited to, a mobile device such as a smartphone, tablet, e-reader, wearable device, or the like; a desktop computer; a laptop computer; a content streaming device; a set-top box; or the like. The user device 600 may correspond to an illustrative device configuration for the user device 300, 400, 502.

The device 600 may be configured to communicate via one or more networks (not shown) with one or more servers, user devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 600 may include one or more processors (processor(s)) 602, one or more memory devices 604 (generically referred to herein as memory 604), one or more input/output ("I/O") interface(s) 606, one or more network interfaces 608, one or more sensors or sensor interfaces 610, one or more transceivers 612, and data storage 616. The device 600 may further include one or more buses 614 that functionally couple various components of the device 600. The device 600 may further include one or more cameras 628 configured to generate images or video, and one or more antennas 640 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 614 may include at least one of a system bus, a memory bus, an address bus, or a message bus, and may permit exchange of information (e.g., data (including computer-executable code), signaling, etc.) between various components of the device 600. The bus(es) 614 may include, without limitation, a memory bus or a memory controller, a peripheral bus, an accelerated graphics port, and so forth. The bus(es) 614 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. The data storage 616 may provide non-volatile storage of computer-executable instructions and other data. The memory 604 and the data storage 616, removable and/or non-removable, are examples of computer-readable storage media (CRSM) as that term is used herein.

The data storage 616 may store computer-executable code, instructions, or the like that may be loadable into the memory 604 and executable by the processor(s) 602 to cause the processor(s) 602 to perform or initiate various operations. The data storage 616 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 616 for non-volatile storage.

More specifically, the data storage 616 may store one or more operating systems (O/S) 618; one or more database management systems (DBMS) 620; and one or more program modules, applications, or the like such as, for example, one or more buffer read/write modules 622, one or more predictive pre-rendering modules 624, and one or more buffer update modules 626. Any of the program modules may include one or more sub-modules. Any of the modules depicted in FIG. 6 may include computer-executable code, instructions, or the like that may be loaded into the memory 604 for execution by one or more of the processor(s) 602. Further, any data stored in the data storage 616 may be loaded into the memory 604 for use by the processor(s) 602 in executing computer-executable code. In addition, any data potentially stored in one or more datastores 632 may be accessed via the DBMS 620 and loaded in the memory 604 for use by the processor(s) 602 in executing computer-executable code. In the illustrated example, the datastores 632 may include user attributes 634 representative of a user of the user device 600. User attributes 634 may include one or more indicators of a user account, a user reading level, a user age or age range, and other user attributes. The datastores 632 may include historical data 636, which may include user reading history, user reading speed history, user reading speed analysis, user reading speed selections, goals, targets, or settings and the like. The datastores 632 may include time adjustment rule(s) 638 which may be used by the reading speed module(s) 626 to determine whether to generate time adjustments for a word or character, and/or to determine a length of a time adjustment for a particular word or character.

The processor(s) 602 may be configured to access the memory 604 and execute computer-executable instructions loaded therein. For example, the processor(s) 602 may be configured to execute computer-executable instructions of the various program modules of the user device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program modules depicted in FIG. 6, the digital content analysis module(s) 622 may include computer-executable instructions, code, or the like that responsive to execution by one or more of the processor(s) 602 may perform functions including, but not limited to, determine characteristics of content rendered or to be rendered, such as language, layout, orientation, character or word analysis, character or word positioning, line spacing, and the like. Computer-executable instructions of the digital content analysis module(s) 622 may be executed to determine character or word difficulty or complexity, user historical data, The identifying marker generation module(s) 624 may include computer-executable instructions, code, or the like that responsive to execution by one or more of the processor(s) 602 may perform functions including, but not limited to, generate identifying markers for one or more words, characters, or images. The identifying marker generation module(s) 624 may further include computer-executable instructions, code, or the like that responsive to execution by one or more of the processor(s) 602 determine colors, fonts, and other identifying markers for which to generate words or characters with.

The reading speed module(s) 626 may include computer-executable instructions, code, or the like that responsive to execution by one or more of the processor(s) 602 may perform functions including, but not limited to, identifying a reading speed associated with a user, identifying aggregate reading speeds of other users or similar users, and the like. Computer-executable instructions of the reading speed module(s) 626 may be executed to determine time intervals associated with particular words, characters, or images, including default times and time adjustments.

The rendering module(s) 630 may include computer-executable instructions, code, or the like that responsive to execution by one or more of the processor(s) 602 may perform functions including, but not limited to, render content, render portions of content with or without identifying markers. Computer-executable instructions of the rendering module(s) 630 may render or re-render content so as to achieve a particular frame rate.

Referring now to other illustrative components depicted as being stored in the data storage 616, the O/S 618 may be loaded from the data storage 616 into the memory 604 and may provide an interface between other application software executing on the device 600 and hardware resources of the device 600. More specifically, the O/S 618 may include a set of computer-executable instructions for managing hardware resources of the device 600 and for providing common services to other application programs (e.g., managing memory allocation among various application programs). In certain example embodiments, the O/S 618 may control execution of the other program modules to dynamically enhance characters for content rendering. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 600 is a mobile device, the DBMS 620 may be any suitable light-weight DBMS optimized for performance on a mobile device.

Referring now to other illustrative components of the device 600, one or more input/output (I/O) interfaces 606 may be provided that may facilitate the receipt of input information by the device 600 from one or more I/O devices as well as the output of information from the device 600 to the one or more I/O devices. The I/O devices may include, for example, one or more user interface devices that facilitate interaction between a user and the device 600 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The device 600 may further include one or more network interfaces 608 via which the device 600 may communicate with any of a variety of other systems, platforms, networks, devices, and so forth. Such communication may occur via any of the types of networks previously described.

The antenna(s) 640 may include any suitable type of antenna depending, for example, on the communications protocols used to transmit or receive signals via the antenna(s) 640. Non-limiting examples of suitable antennas may include directional antennas, non-directional antennas, dipole antennas, folded dipole antennas, patch antennas, multiple-input multiple-output (MIMO) antennas, or the like. The antenna(s) 640 may be communicatively coupled to one or more transceivers 612 or radio components to which or from which signals may be transmitted or received.

As previously described, the antenna(s) 640 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 640 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 640 may be configured to transmit or receive radio frequency signals within any suitable frequency range forming part of the unlicensed portion of the radio spectrum.

The antenna(s) 640 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 640—transmitting or receiving radio frequency (RF) signals in the bandwidth and/or channels corresponding to the communications protocols utilized by the device 600 to communicate with other devices. The transceiver(s) 612 may include hardware, software, and/or firmware for modulating, transmitting, or receiving—potentially in cooperation with any of antenna(s) 640—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, motion sensors, thermal sensors, cameras, and so forth. Example types of inertial sensors may include accelerometers (e.g., MEMS-based accelerometers), gyroscopes, and so forth. In one example, the user devices described herein may include a motion sensor 610 configured to detect an event corresponding to device motion via the motion sensor 610. Such events may be continuous motion for a certain length of time, which may indicate that the user device is not stationary (e.g., the user using the user device is in a car, etc.). The user device may, based at least in part on feedback from the motion sensor 610, determine a first time adjustment for a first character based at least in part on the detected event. In one embodiment, if motion is detected, the user device may generate a time adjustment for the characters, images, or words with identifying markers during the motion. The sensor(s) 610 may further be configured to determine an orientation of the device, and, in some embodiments, adjust the reading speed based at least in part on the orientation of the device. For example, reading speeds in landscape orientation may be increased relative to portrait orientation.

It should be appreciated that the program modules, applications, computer-executable instructions, code, or the like depicted in FIG. 6 as being stored in the data storage 616 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 600, and/or hosted on other computing device(s) accessible via one or more networks, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the device 600 may include alternate and/or additional hardware, software, or firmware components beyond those described or depicted without departing from the scope of the disclosure. More particularly, it should be appreciated that software, firmware, or hardware components depicted as forming part of the device 600 are merely illustrative and that some components may not be present or additional components may be provided in various embodiments. While various illustrative program modules have been depicted and described as software modules stored in data storage 616, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   identifying, by one or more computer processors coupled to at least one memory, a desired reading speed indicative of a number of words per minute a user desires to consume;
   determining a first portion of an electronic book to render on a device, the portion comprising a starting word and an ending word that is subsequent to the starting word;
   determining a number of words in the first portion by identifying the starting word and the ending word of the first portion and calculating the number of words including the starting word, the ending word, and interim words in between the starting word and the ending word;
   determining a base time interval for which to present each of the starting word and the ending word to enable the user to achieve the desired reading speed, wherein the base time interval is a length of time allotted for reading a word and wherein the base time interval is calculated by dividing the desired reading speed by the number of words;

determining, by the one or more computer processors, an average reading difficulty of the starting word and the ending word, wherein reading difficulty is indicative of a number of characters in a word;

determining, by the one or more computer processors, a first time adjustment for the starting word by comparing a first reading difficulty of the starting word to the average reading difficulty of the first portion;

determining, by the one or more computer processors, a first time interval for which to present the starting word to enable the user to achieve the desired reading speed by adding the first time adjustment to the base time interval;

determining that the a second reading difficulty of the ending word does not exceed the average reading difficulty; and determining a second time interval for which to present the ending word to enable the user to achieve the desired reading speed, wherein the second time interval is a length of time allotted for reading the ending word and wherein the second time interval is equal to the base time interval.

2. The method of claim 1, further comprising:

determining a number of words in a first line of text of the first portion of the electronic book meets a line length threshold, wherein the line length threshold is a total number of words per line after which a time adjustment is triggered; and determining a second time adjustment for a first word of a second line of text of the first portion of the electronic book, wherein the second time adjustment is based on a number of words in the first line in excess of the line length threshold.

3. The method of claim 1, further comprising:

identifying a paragraph of the portion of the electronic book;

determining that a third word is a first word of the paragraph;

determining that a fourth word is a last word of the paragraph;

determining a paragraph length of the paragraph, wherein the paragraph length is indicative of a total number of words in the paragraph;

determining an average reading difficulty of words in the paragraph;

determining, at render, a total length of time for reading of the paragraph by:
 multiplying the number of words by the base time interval; and
 determining time adjustments for words exceeding the average reading difficulty of words in the paragraph; and determining a second time adjustment for the third word based on a number of lines in a paragraph preceding the paragraph with the third word;

wherein the third word is presented at a first page and the fourth word is presented on a second page.

4. The method of claim 1, further comprising:

determining that the desired reading speed is below an aggregated average reading speed of other users for the electronic book; and automatically enabling supplemental word definitions for one or more words of the electronic book exceeding the average word difficulty by identifying the one or more words and retrieving supplemental word definitions from a datastore of the electronic book.

5. A method comprising:

identifying a reading speed indicative of a rate at which a user desires to read;

determining a number of words in a portion of content to present to the user;

determining a base time interval for at least one word of the portion of content based at least in part on the reading speed;

determining an average difficulty value of the portion of content;

determining that a first difficulty value of a first word exceeds the average difficulty value;

determining a first time adjustment for the first word based at least in part on the first difficulty value;

determining, by one or more processors coupled to at least one memory, a first time interval for the first word based at least in part on the base time interval and the first time adjustment; and initiating presentation of the portion of content at a device display.

6. The method of claim 5, further comprising:

generating a first median time adjustment for a difficult word that exceeds the average difficulty value, wherein the first median time adjustment is a positive time adjustment; and generating a second median time adjustment for an easy word that is less than the average difficulty value, wherein the second median time adjustment is a negative time adjustment.

7. The method of claim 6, further comprising:

determining that a second difficulty value of a second word exceeds the first difficulty value;

determining a second time adjustment for the second word based at least in part on the second difficulty value, wherein the second time adjustment is greater than the first time adjustment;

determining that a third difficulty value of a third word exceeds the average difficulty value and is less than the first difficulty value; and determining a third time adjustment for the third word based at least in part on the third difficulty value, wherein the third time adjustment is less than the first time adjustment;

wherein an average time adjustment of the first time adjustment, the second time adjustment, and the third time adjustment is equal to the first median time adjustment.

8. The method of claim 6, further comprising:

determining that a second difficulty value of a second word is less than the average difficulty value;

determining a second time adjustment for the second word based at least in part on the second difficulty value;

determining that a third difficulty value of a third word is less than the second difficulty value; and determining a third time adjustment for the third word based at least in part on the third difficulty value, wherein the third time adjustment is less than the second time adjustment;

wherein an average time adjustment of the second time adjustment and the third time adjustment is equal to the second median time adjustment.

9. The method of claim 6, further comprising:

determining a number of difficult words in the portion of content that exceed the average difficulty value;

determining a total positive time adjustment for the portion of content based at least in part on the first median time adjustment and the number of difficult words;

determining a number of easy words in the portion of content that are less than the average difficulty value;

determining a total negative time adjustment for the portion of content based at least in part on the second median time adjustment and the number of easy words;

determining that the total positive time is greater than the total negative time; and decreasing the first median time adjustment such that the total positive time adjustment and the total negative time adjustment are equal.

10. The method of claim 5, wherein determining the first difficulty value of the first word is based at least in part on a number of characters in the first word, a number of possible definitions of the first word, or a language of the first word.

11. The method of claim 5, further comprising:
displaying text on the device display, the text comprising the first word; and
determining a position of the first word relative to other text displayed on the device;
wherein determining the first time adjustment is based at least in part on determining the position of the first word.

12. The method of claim 11, further comprising determining that the first word is positioned at a start of a line of the text, at a start of a paragraph of the text, or at an end of a page of the text.

13. The method of claim 5, wherein the first time adjustment is based at least in part on a spacing between the first word and a second word subsequent to the first word.

14. The method of claim 5, further comprising:
determining that the first word is positioned at a first line of text and a second word is positioned at a second line of text; and
wherein determining the first time adjustment is based at least in part on a line spacing in between the first line of text and the second line of text.

15. The method of claim 5, further comprising:
presenting the first word in a first color and a second word in a second color during the first time interval; and
presenting the first word in the second color and the second word in the first color during a second time interval.

16. The method of claim 5, further comprising:
determining an average reading speed for a user based at least in part on an analysis of historical user data; and
generating a recommendation for a target reading speed based at least in part on the average reading speed.

17. The method of claim 5, further comprising:
presenting the first word with a first identifying marker during the first time interval, wherein the first identifying marker comprises one or more of: marking, emboldening, highlighting, italicizing, enlarging, weighting, or coloring; and
presenting a second word with a second identifying marker for a second time interval after the first time interval.

18. A device, comprising:
a display;
a motion sensor;
at least one memory storing computer-executable instructions; and
at least one processor communicatively coupled to the at least one memory and the display and configured to access the at least one memory and execute the computer-executable instructions to:
identify a reading speed indicative of a rate at which a user desires to read;
determine a number of words in a portion of content to present to the user;
determine a base time interval for at least one word of the portion of content based at least in part on the reading speed;
determine an average difficulty value of the portion of content;
determine that a first difficulty value of a first word exceeds the average difficulty value;
determine a first time adjustment for the first word based at least in part on the first difficulty value; and
determine a first time interval based at least in part on the base time interval and the first time adjustment.

19. The device of claim 18, wherein the at least one processor is further configured to execute the computer-executable instructions to:
generate a first median time adjustment for a difficult word that exceeds the average difficulty value, wherein the first median time adjustment is a positive time adjustment; and
generate a second median time adjustment for an easy word that is less than the average difficulty value, wherein the second median time adjustment is a negative time adjustment.

20. The device of claim 18, wherein the at least one processor is further configured to execute the computer-executable instructions to:
determine an orientation of the device; and
adjust the reading speed based at least in part on the orientation of the device.

* * * * *